INVENTOR.
JOEL A. DEL FRANCIA
ATTORNEYS.

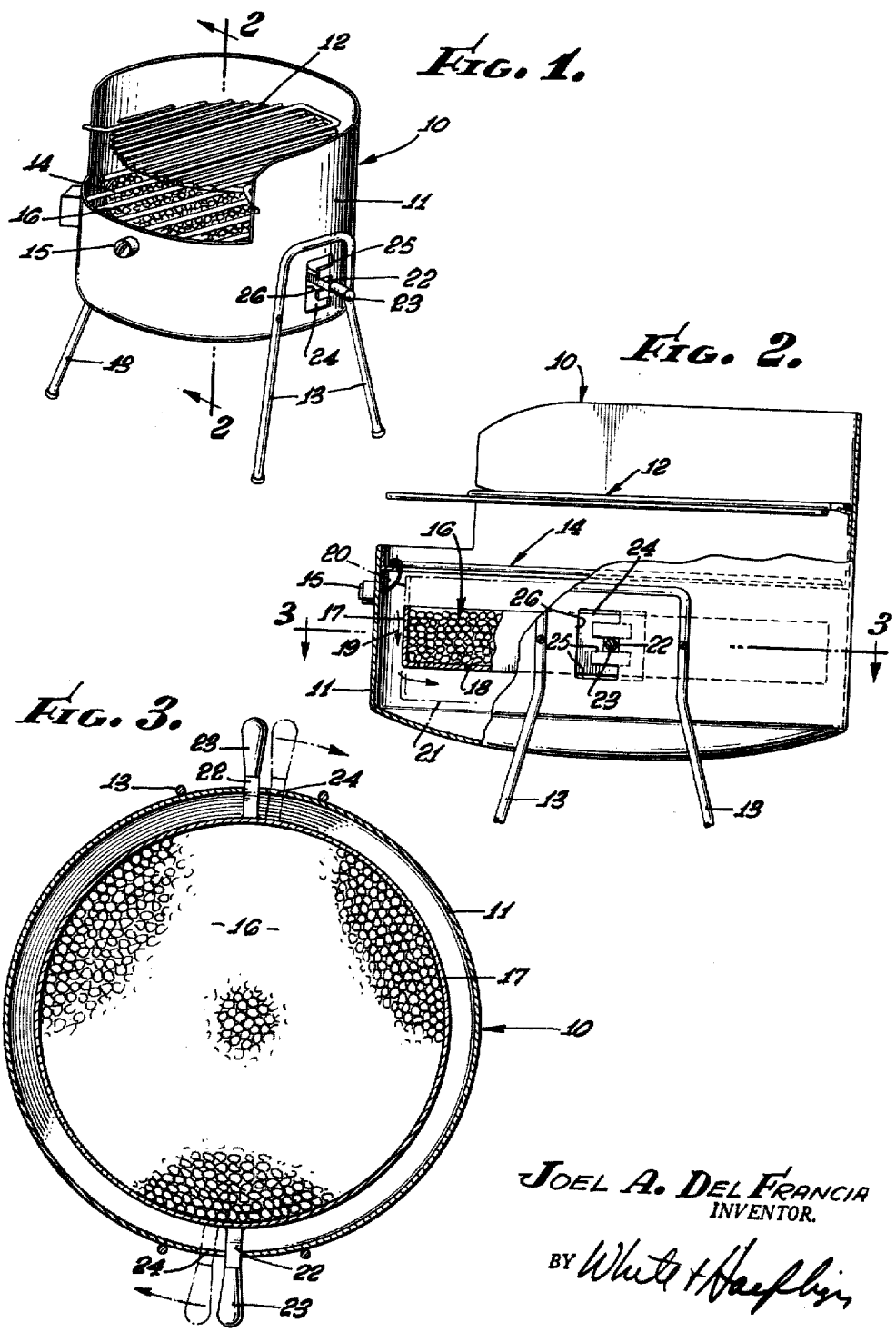

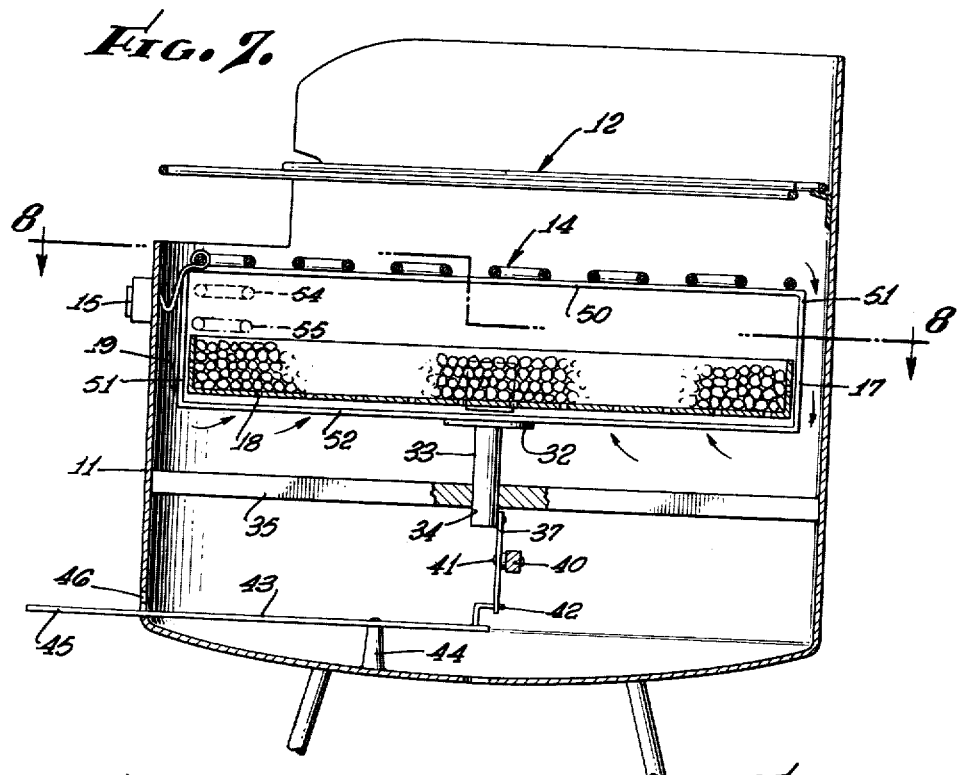
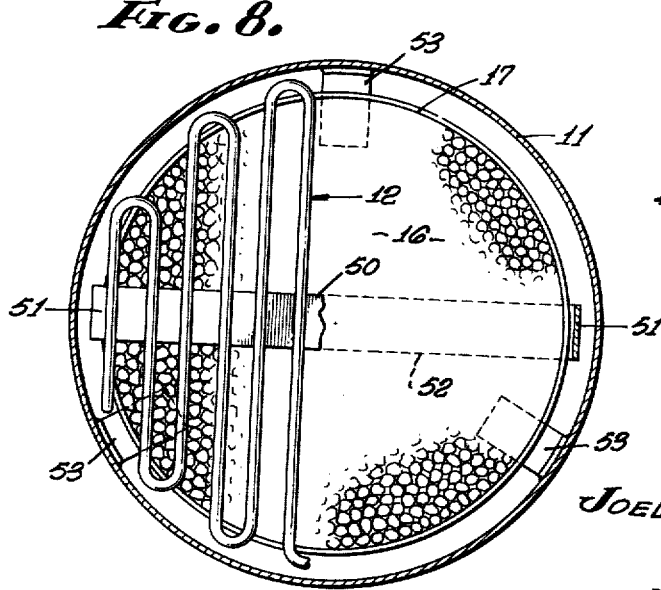
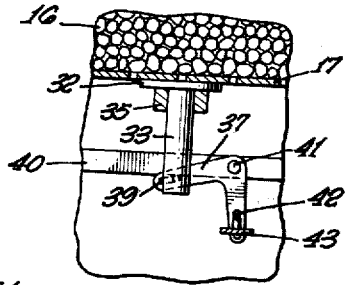

United States Patent Office 3,098,427
Patented July 23, 1963

3,098,427
FULLY ADJUSTABLE ELECTRICAL BROILER
Joel A. Del Francia, Los Angeles, Calif., assignor to Institutional Food Equipment Corp., Los Angeles, Calif., a corporation of California
Filed Aug. 4, 1959, Ser. No. 831,518
6 Claims. (Cl. 99—446)

This invention relates generally to the electrical broiling art, and more particularly concerns what will be shown to comprise a novel rapidly temperature-controllable electrical broiler.

Generally speaking, the cooking temperatures at the grids of known electrical broilers are controlled by adjusting or controlling electrical current delivery to the heating elements which radiate heat to the grid. Such temperature control is undesirably time consuming, since it takes a considerable time for the resistive heating element to come up to operating temperatures when first turned on, and also if its temperature setting is changed during operation, the actual temperature of the element changes quite slowly. The broiler operator becomes acutely aware of this limiting characteristic of electrical heating elements when he desires to broil meat quickly or when he desires rapidly to lower or increase substantially the temperature at the grid for broiling purposes.

The present invention is directed to the solution of the above problem presented by the slow temperature change characteristic or limitation of electrical heating elements. Accordingly, it is a major object to provide what will be characterized as a rapidly temperature-controllable electrical broiler in which the temperature at the grid may be quickly varied without attempting to change the amount of current delivery to the electrical heating element itself. The invention is particularly characterized by the provision of means for rapidly moving the electrical heating element up and down relative to the grid, either alone or in conjunction with a bed of ceramic bodies underlying the heating element and acting to intercept grease drippings falling through the grid from the element. The ceramic body bed also passes air upwardly between the loose ceramic bodies at times to burn the intercepted grease drippings, when such action is desired to produce flaming for giving meat on the grid a charcoal broiled taste. Thus, as will appear, the adjustability of the electrical heating element, and of the ceramic body bed is adapted quickly to control the temperature at the grid for broiling by radiant and reflected heat alone and also for broiling purposes when flame is produced at the grid.

Other objects of the invention include the provision of novel means including a control arm for adjusting the vertical position of the electrical heating element or an openwork receptacle for the ceramic body bed, the weight of the latter being supported through the control arm, and the housing carrying vertically or horizontally spaced shoulders engageable by the control arm to support the latter, the heating element and the ceramic bed at selected elevations.

These and other objects and advantages of the invention, as well as the details of an illustrative embodiment, will be more fully understood from the following detailed description of the drawings, in which:

FIG. 1 is a perspective view of an electrical broiler incorporating a vertically adjustable ceramic body bed underlying the electrical heating element;

FIG. 2 is a section taken on line 2—2 of FIG. 1;

FIG. 3 is a section taken on line 3—3 of FIG. 2;

FIG. 6 is a fragmentary view showing the position of the control mechanism of FIG. 5 when the ceramic bed and element are lowered;

FIG. 7 is a view showing still another embodiment of the invention in which the electrical heating element alone is vertically adjustable; and FIG. 8 is a view taken on line 8—8 of FIG. 7.

Figure 4:
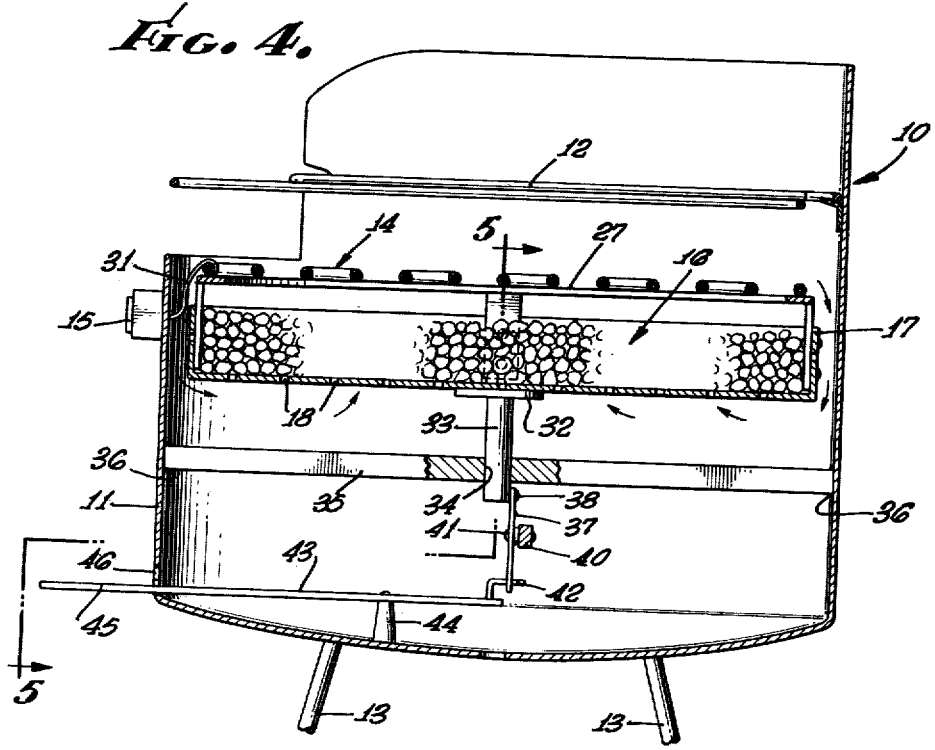
FIG. 4 is a view similar to FIG. 2 showing another embodiment of the invention wherein both the electrical heating element and the ceramic bed are adjustable relative to the grid.

Referring first to FIGS. 1 through 3, the broiler 10 is shown to comprise the upright housing 11, typically but not necessarily cylindrical, in which a fixed position broiling grid 12 overlies the upper interior of the housing. The latter is typically supported on legs 13.

Underlying the spaced cross members of the grid is an openly exposed and open formation resistance type electrical heating element 14, the stretches of which run horizontally within the broiler housing shell. A control for the electrical heating element is shown at 15 at the broiler housing front. Underlying the electrical heating element for intercepting grease drippings falling through the grid from the element is a bed 16 of loose ceramic bodies, typically refractory bodies comprising an insulative material, so that heat will not readily pass downwardly through the bed. On the other hand, air may be drawn upwardly through the bed for at times burning grease drippings intercepted by the top layer of ceramic bodies when the temperature at the location is sufficiently high, as controlled by the vertical spacing between the electrical heating element and the bed 16, as will be described. Such air may circulate downwardly to the underside of the bed around the sides of a receptacle or pan 17 which contains perforations 18 for admitting the air to the bed, air circulation being indicated by the arrows 19. Thus, the broiler shell is kept cool to the touch by cool air circulation around the sides of the pan 17 and upwardly through the pan and the bed of ceramic material.

In the form of the invention shown in FIGS. 1 through 3, temperature control at the grid 12 is effected by lifting and lowering of the ceramic bed 16 in relation to the grid and to the electrical heating element, it being an observed fact that the closer the bed 16 is to the electrical heating element 14 the higher the tempearture will be at the grid, whereas lowering of the bed 16 in relation to the heat-element 14 the higher the temperature will be at the grid, If the bed 16 is raised to the position shown by the broken lines at 20, wherein the bed proximately underlies the element, the grease drippings falling on the bed will ignite and produce flames rising to the grid for giving the meat a charcoal broiled flavor. If however, the pan is lowered to the position shown fully in FIG. 2, or to the position shown by the broken lines 21, no flames will rise to the grid and the temperature at the grid will be substantially decreased. For lifting and lowering of the ceramic bed there is provided a pair of control arms in the form of rods 22 attached to opposite sides of the receptacle 17 and projecting horizontally through the broiler housing 11, where handles 23 are attached to the rods. The broiler housing is slotted at 24 to form horizontal shoulders 25 at desired elevations for supporting the control arms 22 in positions corresponding to the previously discussed positions of the ceramic bed.

Typically, but not necessarily, the broiler housing 11 contains oppositely positioned E-shaped slots 24 as shown to provide the shoulders 25. In operation, when the operator desires a higher temperature at the grid he may pull the control handles 24 toward the front of the broiler to register with the vertical slots 26, and thereafter lift the control handles to the desired upper elevation corresponding to the upper shoulders 25. He may then push the control handles rearwardly to be supported by those shoulders, such elevating of the ceramic bed resulting in almost instantly increased temperature at the grid. Conversely, the operator may grasp the control handles and manipulate them in the slots to lower the ceramic bed and thereby rapidly lower the temperature at the grid.

Figure 5:
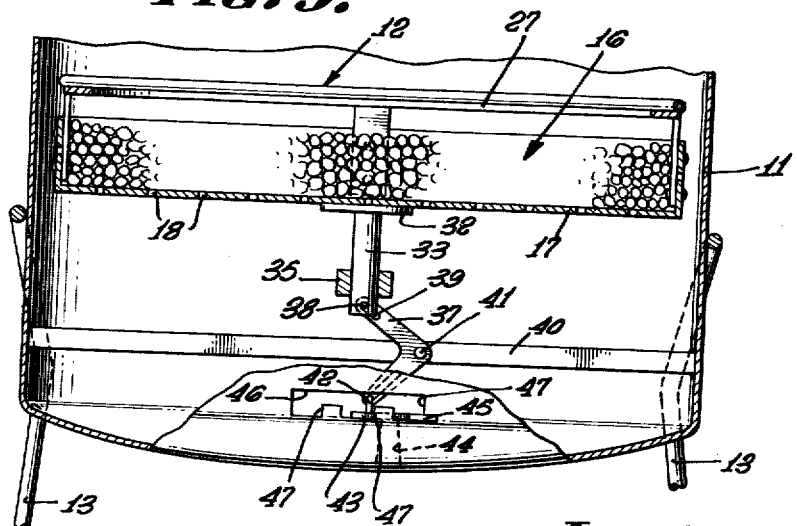
FIG. 5 is a view taken on line 5—5 of FIG. 4.

Referring to FIGS. 4 and 5, the electrical heating element 14 is therein shown as supported on a horizontal cross member 27 which is in turn supported by the receptacle 17 carrying the ceramic bed 16. A flexible lead 31 connects the electrical heating element with the on-off control 15 so that as the element and bed are raised and lowered simultaneously, the element will remain electrically connected with the control.

The cylindrical tray 17 is centrally supported by a flange 32 on a post 33 which is guided for up and down movement by a bearing 34 in a spider 35, the fixed spider being joined to the broiler shell at 36, as illustrated. The lower end of the post 33 has an L-shaped bell crank 37 pivotally attached thereto at 38, the bell crank being slotted at 39 to allow relative movement thereof with respect to the post 33 as the latter is moved up and down by the crank. Another cross member 40 supports the bell crank at pivot location 41, and the lower arm of the crank is pivotally attached to a bracket 42 on a horizontal control arm 43. A fulcrum 44 supports the arm 43 for pivoting in a horizontal plane, the end portion of the arm projecting at 45 through the forward wall of the housing 11 for manipulation by the operator. It will be seen that the arm 43 may be flexed upwardly to register with a horizontal slot 46 in the housing and then travel back and forth in that slot until the arm registers with one of the vertical support shoulders 47 adapted to block horizontal travel of the arm when it is allowed to flex downwardly into the corresponding slot associated with the selected shoulder 47. Thus, as illustrated in FIG. 5, the arm 43 may be held in any one of three different horizontal positions corresponding to three different vertical positions of the heating element 14 and the ceramic bed 16. As previously described, when the element and bed are moved to their uppermost positions, the temperature at the grid is very quickly raised whereas the grid temperature is rapidly lowered when the element and bed are lowered by manipulation of the control arm. If desired, the electrical control 15 may have a high current setting so as to increase the temperature of the electrical element 14 sufficiently for igniting grease drippings falling through the element onto the ceramic bed thereby to produce flaming rising from the bed for giving meat on the grid a charcoal broiled taste.

FIGS. 7 and 8 show another form of rapidly temperature controllable electrical broiler wherein the electrical heating element 14 itself is vertically adjustable by control mechanism the same as shown in FIGS. 4 and 5. The electrical heating element is carried on a cross member 50, the opposite ends of which are supported by uprights 51 outside the periphery of the receptacle 17. The lower ends of the uprights are carried by another cross member 52 which is supported by the flange 32 on the vertically movable post 33.

In this embodiment, the receptacle 17 carrying the bed 16 is supported in fixed position relative to the grid by brackets 53 attached to the inside of the housing 11. With the electrical heating element in its uppermost position as shown in FIG. 7, the temperature at the grid is at a maximum. The grid temperature may be rapidly lowered by manipulation of the arm 43 acting to lower the electrical element to one of the positions shown at 54 and 55. In the latter position the electrical heating element is sufficiently close to the ceramic bed as to ignite grease drippings falling through the element and onto the bed 16, thereby to produce flames rising through the element and to the grid for giving meat a charcoal broiled taste. When it is desired to stop such flaming but keep the temperature at the grid lower than that corresponding to the uppermost position of the element, the latter may be raised to the position indicated at 54 by manipulation of the control arm.

From the foregoing it will appear that the present invention provides a very conveniently operable and rapidly temperature controllable electrical broiler, such rapid control of an electrical broiler heretofore having been unavailable.

I claim:

1. A rapidly temperature-controllable electric broiler, comprising an upright housing, a broiling grid including spaced cross members overlying the upper interior of the housing, an openly exposed and open formation electrical heating element underlying the grid, and a bed of loose ceramic bodies underlying the heating element for intercepting grease drippings falling from the grid through said element and for passing air upwardly between said ceramic bodies to at times burn said intercepted drippings, said electrical heating element and said bed being rapidly movable up and down relative to said grid for quickly varying the temperature at the grid, said bed continuing to underlie the major extent of the heating element during said movement, said bed and heating element extending generally horizontally at all times during said up and down movement.

2. A rapidly temperature-controllable electric broiler, comprising an upright housing, a broiling grid including spaced cross members overlying the upper interior of the housing, an openly exposed and open formation electrical heating element underlying the grid, and a bed of loose ceramic bodies underlying the heating element for intercepting grease drippings falling from the grid through said element and for passing air upwardly between said ceramic bodies to at times burn said intercepted drippings, and means including a control arm for rapidly moving said electrical heating element and said bed up and down relative to said grid for quickly varying the temperature at the grid, said bed continuing to underlie the major extent of the heating element during said movement, said bed and heating element extending generally horizontally at all times during said up and down movement.

3. A rapidly temperature-controllable electric broiler, comprising an upright housing, a broiling grid including spaced cross members overlying the upper interior of the housing, an openly exposed and open formation electrical heating element underlying the grid, and a bed of loose ceramic bodies underlying the heating element for intercepting grease drippings falling from the grid through said element and for passing air upwardly between said ceramic bodies to at times burn said intercepted drippings, said electrical heating element and said bed being rapidly and relatively movable up and down for quickly varying the temperature at the grid, said bed continuing to underlie the major extent of the heating element during said movement, said bed and heating element extending generally horizontally at all times during said up and down movement.

4. A rapidly temperature-controllable electric broiler, comprising an upright housing, a broiling grid including spaced apart cross members overlying the upper interior of the housing, an openly exposed and open formation electrical heating element underlying the grid, a bed of loose ceramic bodies underlying the heating element for intercepting grease drippings falling from the grid through said element and for passing air upwardly between said ceramic bodies to at times burn said intercepted drippings, a perforate receptacle for said ceramic bed, and actuating means including a control arm for moving at least one of said electric elements and receptacle up and down relative to the grid in response to manipulation of said arm to quickly vary the temperature at the grid, said bed continuing to underlie substantially the entirety of said heating element during said movement, said bed and heating element extending generally horizontally at all times during said up and down movement.

5. A rapidly temperature-controllable electric broiler, comprising an upright housing, a broiling grid including spaced apart cross members overlying the upper interior of the housing, an openly exposed and open formation electrical heating element underlying the grid, a bed of loose ceramic bodies underlying the heating element for intercepting grease drippings falling from the grid through said element and for passing air upwardly between said ceramic bodies to at times burn said intercepted drippings, a perforate receptacle for said ceramic bed, actuating means including a control arm for moving at least one of said electric elements and receptacle up and down relative to the grid in response to the manipulation of said arm to quickly vary the temperature at the grid, the weight of said one of said electric element and receptacle being supported through said control arm, means mounting said arm to pivot in a substantially horizontal plane, and horizontally spaced shoulders carried by the housing and supporting said arm, said bed continuing to underlie substantially the entirety of said heating element during said movement, said bed and heating element extending generally horizontally at all times during said up and down movement, said receptacle being generally circular with respect to a central vertical axis and being centrally supported by said actuating means.

6. A rapidly temperature-controllable electric broiler, comprising an upright housing, a broiling grid including spaced apart cross members overlying the upper interior of the housing, an openly exposed and open formation electrical heating element underlying the grid, a bed of loose ceramic bodies underlying the heating element for intercepting grease drippings falling from the grid through said element and for passing air upwardly between said ceramic bodies to at times burn said intercepted drippings, a perforate receptacle for said ceramic bed, and actuating means including a control arm for simultaneously moving said electric element and receptacle up and down relative to the grid in response to the manipulation of said arm to quickly vary the temperature at the grid, said bed continuing to underlie substantially the entirety of said heating element during said movement, said bed and heating element extending generally horizontally at all times during said up and down movement, said receptacle and heating element being centrally supported by said actuating means.

References Cited in the file of this patent

UNITED STATES PATENTS

| | | |
|---|---|---|
| 2,339,422 | Phares | Jan. 18, 1944 |
| 2,790,434 | Francia | Apr. 30, 1957 |
| 2,812,706 | Francia et al. | Nov. 12, 1957 |
| 2,903,549 | Joseph | Sept. 8, 1959 |
| 2,984,730 | Ostrom et al. | May 16, 1961 |

FOREIGN PATENTS

| | | |
|---|---|---|
| 1,182,248 | France | June 23, 1959 |

UNITED STATES PATENT OFFICE
CERTIFICATE OF CORRECTION

Patent No. 3,098,427                         July 23, 1963

Joel A. Del Francia

It is hereby certified that error appears in the above numbered patent requiring correction and that the said Letters Patent should read as corrected below.

Column 2, line 26, for "the" read -- that --; lines 42 and 43, strike out "heat-element 14 the higher the temperature will be at the grid," and insert instead -- heating element rapidly drops the temperature at the grid. --.

Signed and sealed this 4th day of February 1964.

(SEAL)
Attest:
ERNEST W. SWIDER

Attesting Officer

EDWIN L. REYNOLDS

Acting Commissioner of Patents